(12) United States Patent
Kreick et al.

(10) Patent No.: US 6,420,721 B1
(45) Date of Patent: Jul. 16, 2002

(54) MODULATED INFRARED SOURCE

(75) Inventors: John R. Kreick; Hector Durocher, both of Nashua, NH (US)

(73) Assignee: BAE Systems Information and Electronic Systems Integration, Inc., Nashua, NH (US)

(*) Notice: Subject to any disclaimer, the term of this patent is extended or adjusted under 35 U.S.C. 154(b) by 0 days.

(21) Appl. No.: 05/543,299

(22) Filed: Jan. 20, 1975

(51) Int. Cl.[7] .............................. G01J 1/00; H04K 3/00; G02B 26/02; B64D 47/06
(52) U.S. Cl. ................... 250/504 R; 359/233; 359/298; 359/111; 340/981
(58) Field of Search ................................ 250/495, 504, 250/504 R; 340/60, 981, 982; 240/24, 49, 41.35 A, 41.35 C, 41.37, 46.47, 50; 350/259; 359/111, 233, 298

(56) References Cited

U.S. PATENT DOCUMENTS

| | | | |
|---|---|---|---|
| 1,413,379 A | * 4/1922 | Benard | 240/49 |
| 1,417,457 A | * 5/1922 | Cook | 240/49 |
| 1,754,950 A | * 4/1930 | Henocque et al. | 250/494 |

FOREIGN PATENT DOCUMENTS

| | | | | |
|---|---|---|---|---|
| GB | 290333 | * | 6/1928 | 343/113 R |
| IT | 209757 | * | 8/1940 | 240/49 |

* cited by examiner

*Primary Examiner*—Stephen C. Buczinski
(74) *Attorney, Agent, or Firm*—Daniel J. Long (57) ABSTRACT

A modulated infrared source is disclosed in which spatial-on-spatial modulation is accomplished by the rotation of two sets of beam forming optics about an infrared source. Close to 100% of the energy from the infrared source is focused by rotating two sets of parabolically shaped mirrors about the IR source such that energy losses due toe modulation technique are minimized. The speed of the rotation of the reflective optics is minimized while maintaining sufficiently high modulation frequencies the initial provision of four beams from a single source. This is accomplished by the first set of beam forming optics. Moreover, the effects of unwanted reflection are minimized by the four beam configuration. The four beams are then themselves modulated by the second set of beam forming optics.

22 Claims, 4 Drawing Sheets

FIG. 1

PRIOR ART TEMPORAL MODULATION

SPATIAL MODULATION
100% ENERGY UTILIZATION

A  NOTE RETURN TO ZERO LEVEL: SIGNAL MODULATED

B  NOTE NO RETURN TO ZERO LEVEL. SIGNAL NOT SUFFICIENTLY MODULATED

MODULATED INFRARED SOURCE

This invention relates to modulated infrared sources and more particularly and generically to modulators in which spatial-on-spatial modulation is provided by the rotation of two sets of beam forming optics about the infrared (IR) source.

The modulation of infrared radiation, due to its long wavelength, has not been accomplished easily in the past. Problems in modulation of infrared energy include those of unwanted refraction due to the long wavelengths as well as absorption of the energy by the apparatus utilized in the modulation technique. Absorbed energy is reradiated in a diffused pattern thereby in many instances degrading the modulation. Additional problems center around materials which can withstand the infrared radiation while the same time being sufficiently lightweight and structurally stable enough to withstand cyclic motion normally employed in the production of a modulated beam. It will be appreciated that when IR sources include heated elements, modulation of the energy to the element is ineffective to cause modulation of the radiation from the element due to the long heating and cooling cycles inherent with the IR sources in which elements are heated.

One of the most important applications of modulated infrared sources is in the area of infrared countermeasures. In this application the modulated infrared source is employed to render ineffective heat seeking missiles which home in on the heat generated by engines which propel targets. These engines include internal combustion engines, jet engines, rocket engines or the like.

In general, it is the purpose of the infrared countermeasure device to produce a modulated infrared signal of sufficiently high intensity to blanket or mask the infrared output from the above mentioned engines. The waveform of the modulation is also important in that some heat seeking missiles respond both to carrier and modulation. In order to accomplish IR countermeasure of these missiles, IR pulses followed by dead space must be present at the missile. Other missiles are countermeasured by IR pulses alone. It is therefore important to provide an IR countermeasure system which can simultaneously countermeasure both classes of missiles. This is accomplished in the subject invention by "spatial-on-spatial modulation". The term "spatial modulation" refers to the sweeping of an IR beam past a point in space removed from the IR source. The reason that "spatial" modulation is used is because in "spatial" modulation of an IR source very little energy from the source is lost.

Modulated infrared sources used for countermeasuring heat seeking missiles exist in the prior art which employ IR sources with temporal modulators. In one embodiment temporal modulation involves the so-called "chopper" technique, in which apertures spaced from the source are sequentially covered and uncovered in a shutter technique. However, in these sources when the apertures are covered energy radiated from the IR source is either absorbed by the occluding member or reflected back into the source at a non-optimum angle such that this energy is lost. Where energy for the IR source is virtually unlimited such as is the case when fuel is burned for the production of infrared radiation, temporal modulation techniques work well. Moreover, temporal modulation of electrically powered sources works well if sufficient electrical power is available, as is the case with jet powered fighter aircraft. However, where electrical energy is critically limited, it is desirable that as much of the energy from the IR source as possible be utilized in order that the infrared source radiate sufficient energy to blanket the infrared energy from the target's engine.

Moreover, to provide omnidirectional or near omnidirectional coverage the infrared source must be omnidirectional so as to be able to countermeasure heat seeking missiles coming in from any direction. In the prior art omnidirectional coverage has been obtained by the provision of a large number of apertures about the IR source. Temporal modulation is obtained by the rotation of a cylindrically shaped mask in front of the apertures. While these systems are effective where unlimited power is available the provision of temporal modulation presents a problem of efficiency which can be critical in many applications because radiation from the source may be blanketed or masked by the radiation from the target.

Moreover, due to the limited power available the coupling of 100% of the power from IR source out of the source is so critical that the shape of the projected infrared image becomes exceedingly important. Assuming a line source, it has been found that refractive optics which would ordinarily focus and couple out a great deal of the energy from the IR source suffer from the fact that the radiated image is not linear. If the image is considered to be rectangular, with the use of refractive optics, the long sides of the rectangle are bent inwardly in a concave manner. Thus, maximum intensity appears at the center of the rectangular image, with the energy being somewhat reduced towards the ends of the image. When energy levels are critical the refractive optics may result in a situation where the energy from the infrared source is enough less than that of the energy from the target's engines such that the infrared source is blanketed or masked by the infrared energy from the target rather than the other way around. The ratio of infrared energy from the source vis-a-vis infrared energy from the target is called the jam-to-signal ratio and this ratio is a measure of the effectiveness of the infrared source as a countermeasures. It will be appreciated that if this ratio is greater than 1, the infrared source can be effective as a countermeasure.

The above problems are solved by the subject invention in which close to 100% of the infrared energy is coupled out into space by "spatial-on-spatial modulation". Because of the spatial on-spatial modulation, both classes of heat seeking missiles may be simultaneously countermeasured. Generically, in the subject invention spatial-on-spatial modulation is accomplished by rotating two coaxially located sets of focusing optics about a stationary infrared source at a differential rpm commensurate with the modulation frequency and waveform desired. To produce dead space the outer modulator is rotated at a speed considerably lower than that of the inner modulator. The optics in the preferred embodiment are reflective optics although refractive optics may be utilized in situations in which the energy degradation caused by the refractive optics is not critical. Each set of reflective optics in one embodiment comprise narrow parabolically shaped reflectors adjacent an omnidirectional infrared source so that close to 100% of the radiation from the source is coupled out of the system. Moreover, in this system more intense beams are formed due to the additional focusing at the outer modulator. The reflective elements used generate highly defined beams with unusually sharp edges. The source is located at the focii of the parabolas which define the reflector cross sections for both of the modulators, and the parabolas of both modulators are rotated about their focii. Multiple reflectors may be provided to provide multiple beams. In one embodiment the IR source is a line source and the reflectors focus the radiation from this source into a number of vertically extending lines which are projected out away from the source. These lines subtend a vertical angle of almost 180° to give omnidirectional coverage with sweep of a lie 360° in azimuth.

It is therefore an object of this invention to provide an improved modulated infrared source.

It is another object of &is invention to provide a spatial-on-spatial modulated infrared source.

It is a further object of this invention to provide a spatial modulator for an infrared source in which beam intensity is enhanced.

It is a still further object of this invention to provide reflective focusing by two sets of modulators for an infrared source in which the beam formed by the focusing means is extremely sharp and well defined in the infrared region of the electro-magnetic spectrum.

It is a yet still further object of this invention to provide a modulated omnidirectional infrared radiation source isotropic in azimuth and capable of countermeasuring all known types of heat seeking missiles.

These and other objects of this invention will be better understood in connection with the following description in view of the appended drawings in which.

DETAILED DESCRIPTION

Figure 10:
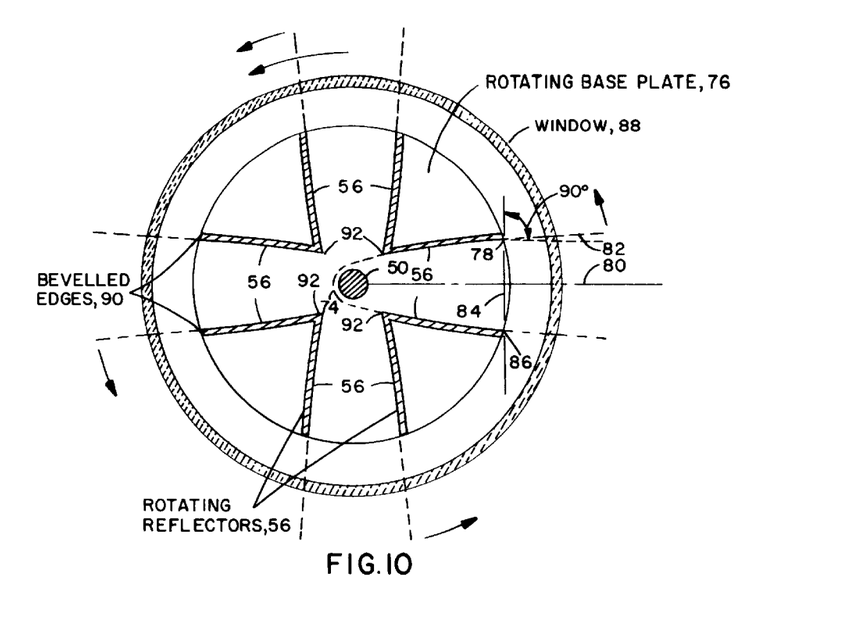
FIG. 10 is a sectional view of the apparatus of FIG. 9 taken along section lines 10—10.

Prior to describing the spatial-on-spatial modulation which is the subject matter of this patent application, a detailed description of spatial modulation and the problems and solutions pertinent thereto are presented. It will be appreciated that two modulators are used for spatial-on-spatial modulation and that in a preferred embodiment the spatial modulator of FIG. 10 is duplicated in expanded form for the second spatial modulator. Spatial-on-spatial modulation is described in connection with FIG. 12.

Figure 1:
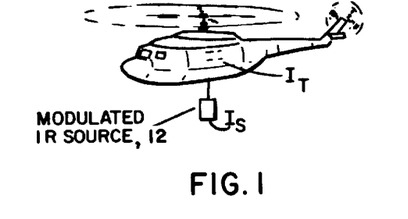
FIG. 1 is a diagrammatic representation of a typical infrared countermeasure situation.

Referring now to FIG. 1, a target 10 such as a helicopter is provided. with a modulated infrared source 12. This source has an omnidirectional radiation pattern to give a sphere of protection for the helicopter. Because of the internal combustion or jet engine of the target the target radiates in the infrared region of the electromagnetic spectrum. The intensity of this infrared radiation is designated $I_T$ and in general involves a particular signature which varies with the configuration of the target as well as with the particular heat generating engine utilized. The intensity of the modulated infrared source is designated $I_S$. If the ratio of $I_S$ to $I_T$ at any point in the far field is equal to or greater than 1 the modulated infrared source can be effective in countermeasuring incoming heat seeking missiles. Moreover, in some circumstances this ratio can be less than 1 and the modulated source will still be effective as a countermeasure. It is the function therefore of the modulated infrared source to mask the infrared radiation from the target with a signal which will reduce the ability of the heat seeking missile to track the target and indicate to the heat seeking missile that the target is at a position in space removed from its actual position so that the heat seeking missile homes in on a point in space at a distance sufficiently removed from the target to prevent damage to the target. This has been accomplished in the past by modulating the infrared source so that the detected radiation has a predetermined pulse pattern commensurate with that of the homing system of the missile.

As mentioned hereinbefore, where energy availability is not a problem as with the burning of fuel for the infrared source, achieving the requisite $I_S/I_T$ ratio can be easily accomplished. However, for those targets in which energy is at a premium a more efficient modulating means than the temporal modulation of the prior art is necessary.

Figure 2:
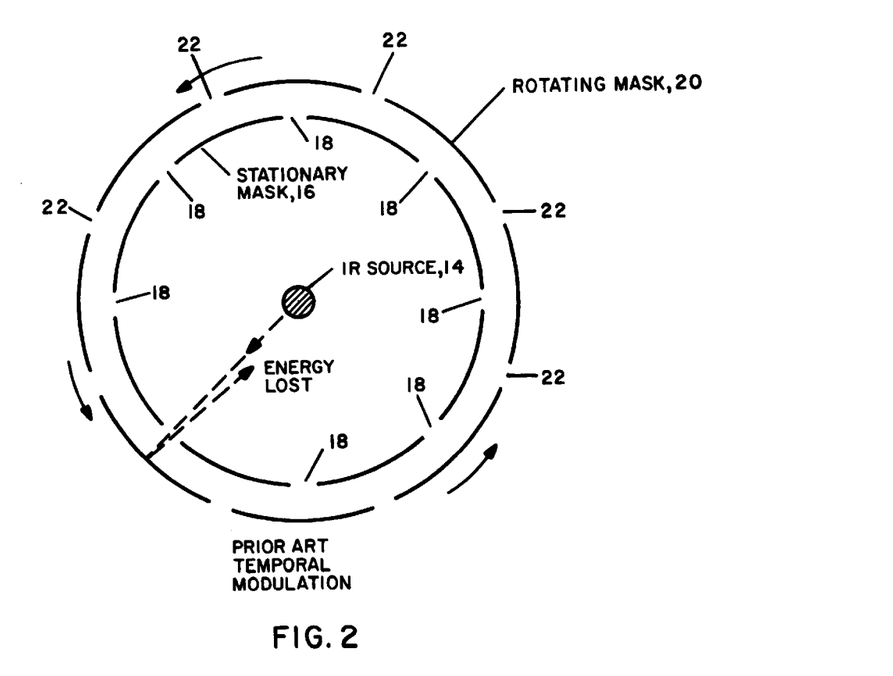
FIG. 2 is a diagrammatic representation of temporal modulation of an infrared source.

Temporal modulation of an infrared source, commonly known as "chopping", may be accomplished by the apparatus illustrated in FIG. 2. In this case an infrared source 14 is located within a stationary mask 16 which has apertures 18 spaced around the periphery. The stationary mask is located co-axially with respect to a rotating mask 20 having apertures 22 which, when the mask 20 is rotated, Came into alignment with apertures 18 in the stationary mask. When apertures 18 and 22 are in alignment radiation from the infrared source 14 is transmitted to the far field. When there is misalignment between apertures 18 and 22 energy from the infrared source is either absorbed by the rotating mask or reflected back to the infrared source. It will be appreciated that a large portion of this energy is lost in this process, making the temporal modulator of FIG. 2 unacceptable in situations where only a limited amount of energy is available. As mentioned before, when energy is not at a premium the temporal modulation technique illustrated in FIG. 2 is entirely satisfactory for counter-measure purposes. However, because the energy is not focused from the IR source and more importantly because during a portion of the cycle the energy is absorbed by the rotating mask, the temporal modulation is not desired.

Figure 3:
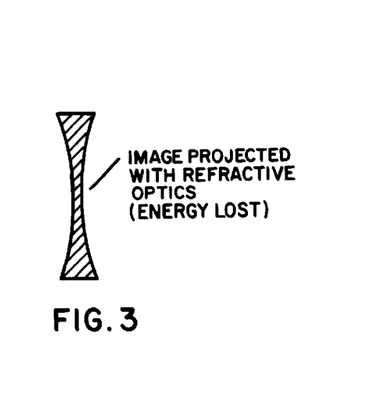
FIG. 3 is a diagrammatic representation of an image projected with refractive optics.
Figure 4:
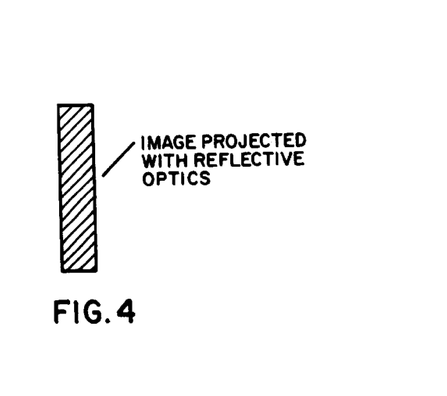
FIG. 4 is a diagrammatic representation of an image projected with reflective optics of the type constructed in accordance with the subject invention.

In addition to the provision of energy of the requisite intensity so that the above mentioned ratio is favorable, there is the problem of providing isotropically projected energy around an azimuth such that the energy is not distorted. When refractive optics are utilized to focus energy from an infrared source the image projected is not isotropic as illustrated in FIG. 3 but rather is broadened towards the edge of the image when a line source is projected. Thus when the modulated IR source is operating with very little tolerance in the margin necessary for the appropriate ratio it will be appreciated that intensity near the edge of the projected image may drop below the required ratio and thus the modulated source will be ineffective as a countermeasure. It is therefore desirable to project an image such as illustrated in FIG. 4 from a line source, in which the projected image is not too distorted. For the isotropically projected image the energy distribution across the projected image is uniform and maximized so that maximum use of the infrared source is possible.

However, when energy is at a premium the temporal technique cannot be utilized and spatial modulation is required.

Figure 5:
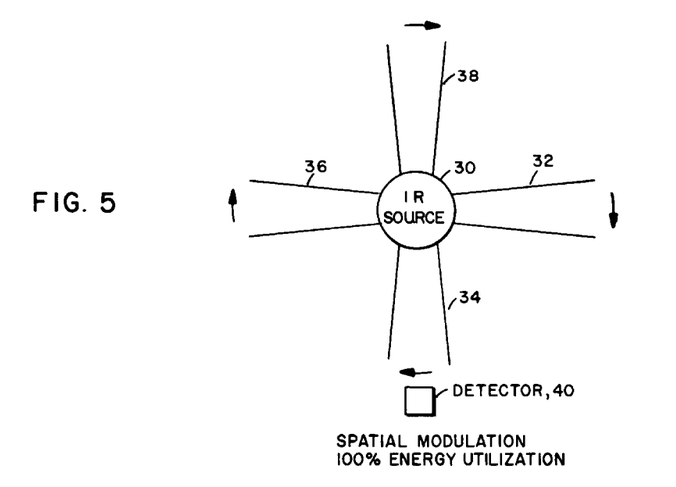
FIG. 5 is a diagrammatic representation of a four beam spatial modulation technique.
Figure 6:
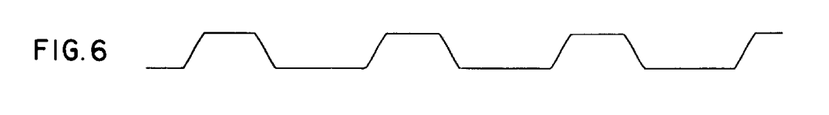
FIG. 6 is a waveform diagram of intensity vs. time for radiation from the source of FIG. 5 as detected at a point in space removed from the source.

Referring to FIG. 5, the concept of spatial modulation is illustrated. In general, spatial modulation refers to the transmission of one or more beams from an infrared source. In this diagram an infrared source 30 is illustrated as projecting four narrow collimated beams 32, 34, 36 and 38. As illustrated the beams are made to rotate or revolve about the source such that the beams are swept by a detector 40 sequentially. The desired waveform at the detector 40 is illustrated in FIG. 6 to be a relatively sharp pulsed waveform in which the rise and decay of the pulse occurs rapidly. As mentioned hereinbefore, because of the relatively long wavelength of the infrared radiation the obtaining of such a sharp waveform is difficult. Generation of such a waveform will be described in connection with FIGS. 9 et sequin. However, for the present purposes of discussion spatial modulation refers to the sweeping of a collimated infrared beam past a point in space.

As illustrated in FIG. 5, four beams are rotated or swept past detector 40. The reason for the four beam configuration is now described with reference to FIG. 7.

Figure 7:
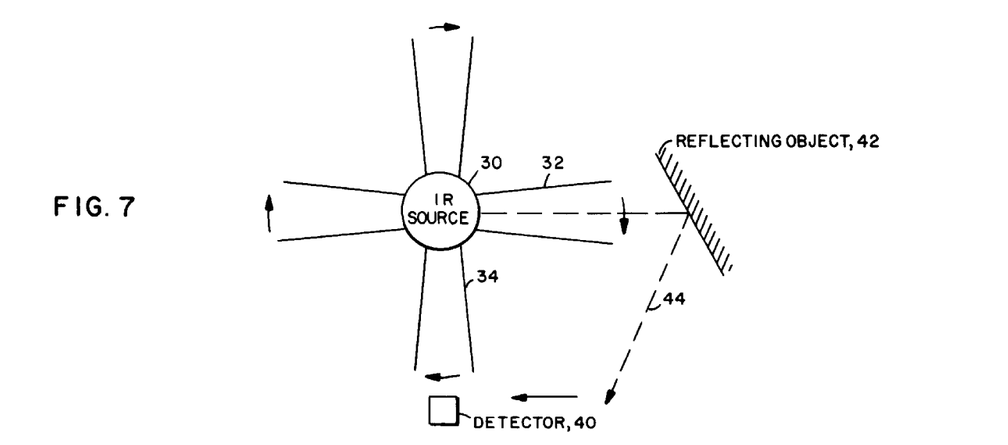
FIG. 7 is a diagrammatic illustration of a spatially modulated infrared source in which a portion of the radiation impinges on a reflecting object and is reflected in the vicinity of a detector spaced from the IR source FIG. 8 includes a series of waveform diagrams illustrating the effect of reflected radiation on the output of the IR source of FIG. 7 at a point removed from the IR source.

Referring to FIG. 7, infrared source 30 projects a narrow beam 32. When the infrared source is located at a target it is possible that portions of the target close to the infrared source may act as reflectors for the source. These reflectors may inadvertently provide that the infrared radiation reaching detector 40 will resemble more a DC signal than a modulated signal. As illustrated in FIG. 7 a reflective object 42 may be in the path of beam 32 such that beam 32 is reflected as illustrated by a dotted line 44 towards detector 40 and will arrive at detector 40 after beam 35 has been detected.

Figure 8:
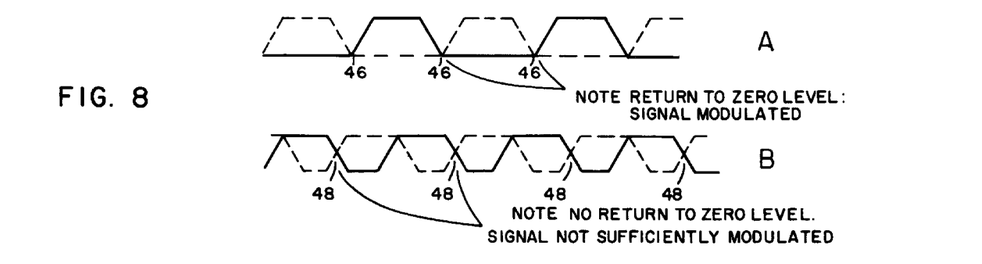

Referring to FIG. 8, and more especially to waveforms designated A, the waveform from the reflecting object illustrated by the dotted pulse waveform may occur such that the detected signal returns to zero thereby preserving the modulation. As can be seen the combined waveform returns to a zero level at points 46. Thus while the detected signal will have a component from the reflecting object it will be appreciated that the detected signal is still modulated albeit at some other frequency.

Referring to waveforms designated B of FIG. 8, if a larger number than four beams are projected, radiation returned from the reflecting. object may overlap significantly the direct radiation from the infrared source such that there will be no return to zero of the radiation detected by detector 40. The closest that the combined waveform comes to reaching the zero level is illustrated by points 48. Thus it is possible that a signal which is not sufficiently modulated will result. In general the maximum number of beams that can be projected without substantial reflective interference is a function of the duty cycle of the pulse train produced at a point in space removed from the source.

More Specifically:

$$\text{the maximum number of beams} = 2 \times \frac{1}{\text{duty cycle}} \quad (1)$$

where, $$\text{the duty cycle} = \frac{\text{angular beam width measured at 0 level of beam}}{\text{angular spacing between the beams}} \quad (2)$$

For a 50% duty cycle, the largest number of beams that can be produced without the possibility of substantial overlap is 4, with the four beams spaced at 90°. When the beam width of the radiation is no more than 45° it is possible to limit the effects of reflected radiation so that the modulation is not destroyed.

It will be apparent that the narrower the beam the narrower the pulses produced and the more beams that can be projected without destructive interference due to reflection. Conversely the wider the projected beams the wider the pulses produced and the lower the number of beams that can be projected without interference. In general the wider the beam the wider the pulses produced and the greater the chance of overlap.

As a practical matter, anywhere from one to four beams may be utilized. If one beam is utilized, it will be appreciated that the optics necessary to form this beam must be rotated at high speeds. The speed decreases with the number of beams with the optimum being a four beam configuration. The trade-off is essentially the mechanical stability of the rotating optics and the ability to dynamically balance the rotor versus the narrowness of the beams and the duty cycle.

Figure 9:
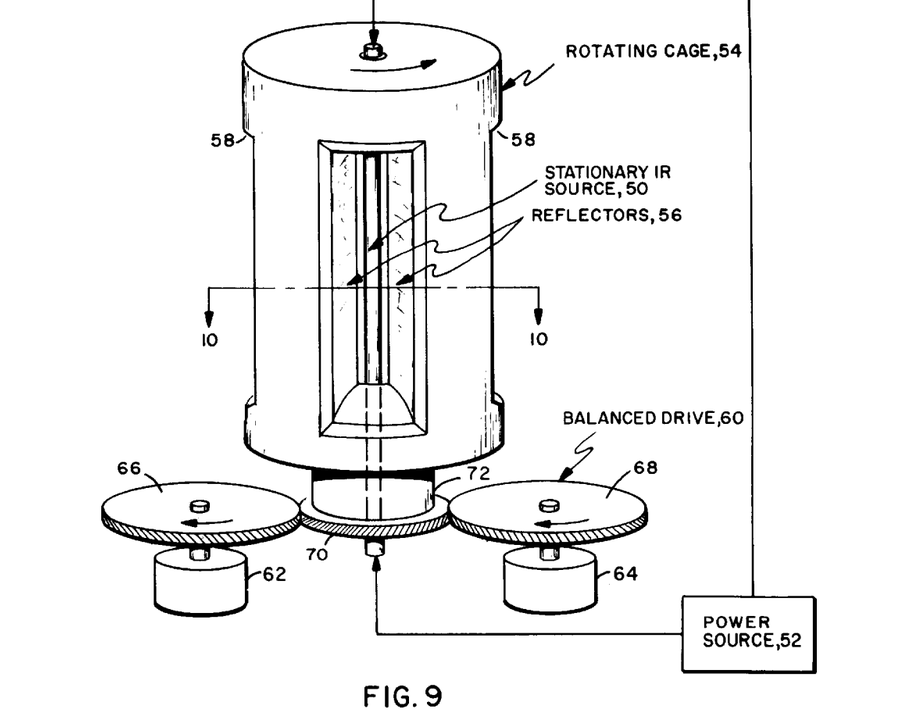
FIG. 9 is a diagram of one embodiment of a spatially modulated infrared source.

Apparatus which can efficiently provide spatial modulation while at the same time providing close to 100% energy utilization is illustrated in FIG. 9.

Referring to FIG. 9, a four beam modulator is illustrated in which the infrared source is stationary and in which the beam width as measured at the zero level is 45° (note, at the 50% level the beam width is 36°). The infrared source in this figure is designated by reference character 50 and is of a type which is electrically powered by a power source 52. In one embodiment the heated element is silicon carbide element developed by the Norton Corp. under the trademark CRYSTAL. It will be appreciated, however, that the heating element may be any type of heating element including either a fuel fired element or an indirectly powered element as well as an electric element. Surrounding the stationary infrared source is a rotating cage 54 which houses reflectors 56. The rotating cage includes beveled apertures 58 to provide sharply defined bear and relatively sharp pulses, with the beveling providing protection against diffusion or unwanted refraction of the infrared energy. At the base of the cage is a balanced drive unit 60 which includes two drive motors 62 and 64 with accompanying gears 66 and 68 respectively. These gears mesh with a gear 70 fixedly attached to the base 72 of the rotating cage. The projected image from this modulator consists of a number of lines which subtend an arc of almost 180°. With the sweep of a line through 360° in azimuth omnidirectional protection is achieved.

Referring to FIG. 10, the configuration of the reflectors 56 of FIG. 9 is illustrated. In general the reflectors are elongated in a vertical direction and have a cross section conforming to a portion of a parabola 74 which has the stationary infrared source 50 at its focus. The reflectors are mounted on a base plate 76 as illustrated. As will be appreciated the parabola chosen is a very narrow parabola and is configured such that a tangent to the surface of the reflector at the outward edge of the reflector (cf point 78) is as close to being parallel to center line 80 as possible. In other words, this tangent herein illustrated by reference character 82 should be close to a perpendicular to a line 84 running between point 78 and point 86 on an adjacent reflector making up the other side of the parabola. In the embodiment illustrated the rotating cage is located within a window 88 which is transparent to the infrared radiation.

It will also be appreciated that the outwardly extending edge of each reflector 56 is provided with a beveled edge 90 which is important to minimize specular reflection and to prevent degradation of the output signal. The beveled edges are in part responsible for the relatively sharp rise and decay characteristic of the received infrared signal. In one embodiment the beveling of an edge produces a surface which lies in a plane perpendicular to the center line of a beam coming through the associated aperture formed by an associated pair of reflectors.

It will be appreciated that in this configuration 100% of the radiation from the infrared source 50 is focused to the far field absent slight absorption at the reflective elements themselves. In a p referred embodiment the reflective elements are made from rolled aluminum sheets which can be rolled to approximate the requisite portion of the aforementioned narrow parabola. It will be appreciated therefore that with the revolving of the base plate 76 the reflectors 56 also rotate with the reflectors having been mounted as vertically standing columns between the rotating base plate and a top plate. The reflectors are also fixedly attached to the rotating cage illustrated in FIG. 9 at the edges of the apertures so as to maintain rigid support for the reflectors. (Moreover, the reflectors are joined one to another at points 92 both for added structural rigidity and to prevent IR leakage.) The structure thus defined with the reflectors being mounted and fixedly attached to a cylindrical rotating cage and to both top and base plates therefore, provides a uniquely stable modulating element in which the configuration of the reflectors, is structurally maintained. Because of the point symmetry of the modulator dynamic balancing is easily achieved. It will be appreciated therefore in its most simple configuration the modulator consists of the revolving of a number of reflectors having parabolic cross sections about a longitudinal axis corresponding to the focus of the focii of the parabolic reflectors with the stationary infrared source being located also at this focus.

Figure 11:
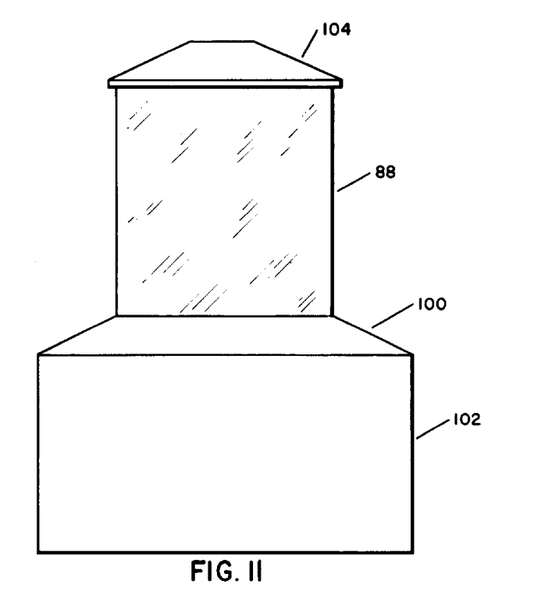
FIG. 11 is a plan view of the housing for the apparatus of FIG. 9.

The apparatus illustrated in FIG. 9 may be located in a housing 100 which includes window 88 of FIG. 10, an expanded base portion 102 and a cap 104. This is illustrated in FIG. 11.

The radiation pattern from this modulator is nearly omni-directional with a sweep of a beam which sweeps out a nearly spherical volume. However, immediately above and below the modulator are cylinders of no radiation.

This is not a problem since infrared missiles cannot usually attack from a vertically oriented trajectory.

Figure 12:
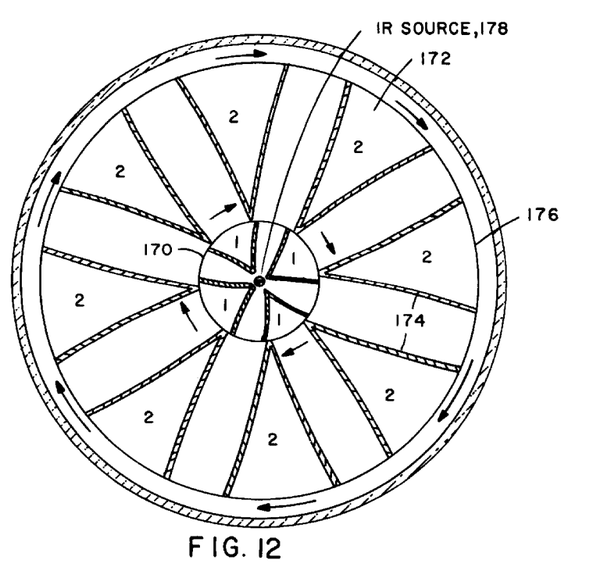
FIG. 12 is a diagrammatic representation of a modulator for an infrared source involving spatial-on-spatial modulation.

What has been described up to this point is a modulator for spatial modulation of an infrared source. Referring now to FIG. 12, a spatial-on-spatial modulation system is illustrated utilizing spatial modulator 170 which is identical to that described in connection with FIG. 10. Surrounding spatial modulator 170 is an additional spatial modulator designated 172 in which reflective elements 174 are mounted on a disk 176 such that the modulators are coaxially aligned. The cross sectional shape of the reflectors 174 is again parabolic with the focii of the parabolas being the infrared source, in this case source 178. Outwardly lying edges may also be beveled as described hereinbefore.

It will be appreciated that rather than obscuring radiation during the relative movement between modulator 170 and 172 the radiation is channeled into different beams by the relative movement between the two modulators. This preserves, close to 100% of the infrared energy, since none is reflected back to the source. In one embodiment modulator 170 revolves faster than modulator 172 to provide the waveform illustrated in FIG. 13. Here large periods of no infrared energy occur at a point in space removed from the modulated IR source. This is sometimes referred to as "dead time" or "dead space". In this embodiment a large window 180 may be provided to surround the entire apparatus. The output of this combined apparatus is likewise omnidirectional through one 360° sweep. Because the apparatus is omnidirectional it can be mounted virtually anywhere on the outside of an aircraft. The amount of IR radiation blocked by the aircraft in this far field is minimal, and thus locating the device or thief aircraft is not a problem.

Figure 13:
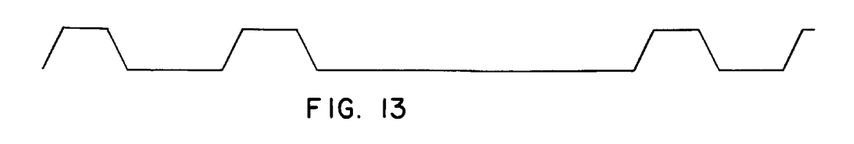
FIG. 13 is a waveform diagram of the radiation from the FIG. 12 modulator at a point in space.

It is a property of the waveform of FIG. 13 that it is capable of countermeasuring missiles which utilize pulse coding and those which utilize both pulse and carrier coding for their internal guidance systems. In one embodiment, the waveform of FIG. 13 may include six pulses followed by a dead space. This is accomplished by rotating the outer modulator at $\frac{1}{12}$th the speed of the inner modulator. Moreover, the gain per pulse (increase in pulse amplitude) is equal to 1/duty cycle of the outer modulator, when the duty cycle for the outer modulator is determined in the same manner as the duty cycle for the inner modulator described hereinbefore.

Thus with the spatial-on-spatial modulation, one half the pulses can be generated with considerable pulse amplitude increase.

It will be appreciated that a large variety of spatial modulations can be accomplished by varying the relative speeds of the modulators. This is important in striking the right waveform and frequency to countermeasure the greatest number of types of missiles.

However, it has been found that once this is set, the waveform produce is effective against all known heat seeking missiles. Thus, one modulator offers complete protection.

Moreover, if the modulators take on the preferred configuration, close to 100% of the energy from the source is coupled out of the system. This invention is not, however, limited to the particulars of the modulators described. F or instance, any beam forming apparatus which produces a sweeping beam may be utilized and is within the scope of this invention. Likewise any apparatus which further sweeps the beam so as to produce the desired waveform is likewise within the scope of this invention. This would, of course, include single beam sweeping systems and systems in which the reflectors are not parabolic. Moreover, the focusing optics need not be revolved about the IR source but may rather reciprocate so as to sweep a beam periodically past a point in space, with the appropriate dead time. It will further be appreciated that the direction of sweep of the beam is not critical. It is only important that the sweeps be-controlled to produce a number of consecutive pulses at a point in space followed by dead time.

Although a specific embodiment to the invention has been described in considerable detail for illustrative purposes, many modifications will occur to those skilled in the art. It is therefore desired that the protection afforded by Letters Patent be limited only by the true scope of the appended claims.

We claim:

1. A modulated infrared source comprising,
   means for generating infrared radiation at a first position in space,
   means for spatially modulating energy from said infrared generating means by focusing infrared radiation from said generating means into a beam and by moving said focusing means so as to sweep said beam past points in space, and means for spatially modulating energy from said first mentioned spatial modulating means by sweeping the beam formed by said first mentioned spatial modulating means, thereby to produce spatial-on-spatial modulation at a second position in space removed from said first position.

2. The infrared source of claim 1 wherein both of said spatial modulating means include focusing optics and means for moving said focusing optics about said infrared radiation generating means.

3. The infrared source of claim 2 wherein said focusing optics are coaxially located with respect one to another.

4. The infrared source of claim 3 wherein said focusing optics include reflectors having parabolic cross sections with the reflectors conforming in cross section to parabolas having a common focus, with said generating means at said common focus and with the movement of said focusing optics being accomplished by the movement of said parabolas about said common focus.

5. The infrared source of claim 4 wherein said reflectors include roll-formed aluminum sheets.

6. The infrared source of claim 4 wherein said means for generating said infrared radiation includes a vertically extending line source, wherein said reflectors include parabolically curved vertically extending sheets of reflecting material, said sheets lying on portions of a parabola which includes a portion of said line source at its focus.

7. The infrared source of claim 6 and further including a cylindrical housing having longitudinally extending apertures and a bottom plate, means for mounting pairs of facing reflective sheets vertically on either side of said apertures, said sheets extending width wise from said apertures inwardly towards the center of said housing.

8. The infrared source of claim 7 and further including means for joining said reflective sheets along the vertically extending edge of said sheets furthest removed from said apertures and wherein said focusing optics moving means includes means for rotating said apertured cylindrical housing.

9. The infrared source of claim 8 wherein said line source is located coaxially said cylindrical housing along the center line thereof and further including means for supporting said line source free of said cylindrical housing so that said line source is stationary.

10. The infrared source of claim 7, wherein edges of said reflective sheets adjacent said apertures are beveled to sharpen the beam emanating from said apertures.

11. A modulated infrared source comprising means for generating infrared radiation at a first position in spaces, means for spatially modulating the radiation from said infrared source by generating a beam of infrared radiation from said source and by periodically sweeping said beam past points in space removed from said first position to generate a number of pulses of infrared energy at each point in space, and means for spatial modulating the radiation from said first mentioned spatial modulating means by periodically sweeping said first mentioned beam such that a beam is formed which sweeps by a second position in space removed from said first position a predetermined number of times followed by a period of dead time, thereby to provide a pulse intensity versus time waveform at said second position in which pulses are followed by periods of no infrared radiation from said generating means.

12. Infrared countermeasure apparatus which generates modulated infrared radiation for countermeasuring heat seeking ordinance devices having a homing capability tracking a target comprising, means for generating infrared radiation at a first position in space of sufficient intensity to affect the homing capability of said heat seeking ordinance devices, means for spatially modulating energy from said infrared generating means, and means for spatially modulating energy from said first mentioned spatial modulating means, thereby to produce spatial-on-spatial modulation at a second position in space removed from said first position.

13. The infrared countermeasure apparatus of claim 12 wherein both of said spatial modulating means include focusing optics and means for moving said focusing optics about said infrared radiation generating means.

14. The infrared countermeasure apparatus of claim 13 wherein said focusing optics are coaxially located with respect one to another.

15. The infrared countermeasure apparatus of claim 14 wherein said focusing optics include reflectors having parabolic cross sections, with the reflectors conforming in cross section to parabolas having a common focus, with said generating means at said common focus and with the movement of said focusing optics being accomplished by the movement of said parabolas about said common focus.

16. The infrared countermeasure apparatus of claim 15 wherein said reflectors include roll-formed aluminum sheets.

17. The infrared countermeasure apparatus of claim 15 wherein said means for generating said infrared radiation includes a vertically extending line source, wherein said reflectors include parabolically curved vertically extending sheets of infrared radiation reflecting material, said sheets lying on portions of a parabola which includes a portion of said line source at its focus.

18. The infrared countermeasure apparatus of claim 17 and further including a cylindrical housing having longitudinally extending apertures and a bottom plate, means for mounting pairs of facing reflective sheets vertically on either side of said apertures, said sheets extending width wise from said apertures inwardly towards the center of said housing.

19. The infrared countermeasure apparatus of claim 18 and further including means for joining said reflective sheets along the vertically extending edge of said sheets furthest removed from said apertures and wherein said focusing optics moving means includes means for rotating said apertured cylindrical housing.

20. The infrared countermeasure apparatus of claim 19 wherein said line source is located coaxially within said cylindrical housing along the center line thereof and further including means for supporting said line source free of said cylindrical housing so that said line source is stationary.

21. The infrared source of claim 13 wherein edges of said reflective sheets adjacent said apertures are beveled to sharpen the beam emanating from said apertures.

22. Modulated infrared countermeasure apparatus which generates modulated infrared radiation for countermeasuring heat seeking ordinance devices having homing a capability tracking a target comprising means for generating infrared radiation at a first position in space of sufficient intensity to affect the homing of said heat seeking ordinance devices, and means for spatially modulating the radiation from said infrared source such that a beam sweeps by a second position in space removed from said first position a predetermined number of times followed by a period of dead time, thereby to provide a pulse intensity vs. time waveform at said second position in which pulses are followed by periods of no infrared radiation from said generating means.

* * * * *